(12) United States Patent
Humalajoki et al.

(10) Patent No.: US 10,465,339 B2
(45) Date of Patent: Nov. 5, 2019

(54) SYSTEM AND A METHOD FOR PRODUCING AQUEOUS SULPHURIC ACID

(71) Applicant: Valmet Technologies Oy, Espoo (FI)

(72) Inventors: Asta Humalajoki, Ruutana (FI); Antti Vaeljae, Vloejaervi (FI); Heikki Airikkala, Tampere (FI); Seppo Tuominiemi, Pirkkala (FI); Peter Bjoerklund, Umea (SE)

(73) Assignee: Valmet Technologies Oy, Espoo (FI)

( * ) Notice: Subject to any disclaimer, the term of this patent is extended or adjusted under 35 U.S.C. 154(b) by 0 days.

(21) Appl. No.: 16/323,758

(22) PCT Filed: Aug. 17, 2017

(86) PCT No.: PCT/FI2017/050579
§ 371 (c)(1),
(2) Date: Feb. 6, 2019

(87) PCT Pub. No.: WO2018/046791
PCT Pub. Date: Mar. 15, 2018

(65) Prior Publication Data
US 2019/0177914 A1 Jun. 13, 2019

(30) Foreign Application Priority Data

Sep. 7, 2016 (FI) .................................. 20165665

(51) Int. Cl.
| | | |
|---|---|---|
| *C01B 17/80* | (2006.01) | |
| *D21C 11/00* | (2006.01) | |
| *D21C 11/06* | (2006.01) | |
| *D21C 11/04* | (2006.01) | |
| *B01D 5/00* | (2006.01) | |
| *C01B 17/60* | (2006.01) | |

(52) U.S. Cl.
CPC ............ *D21C 11/06* (2013.01); *C01B 17/803* (2013.01); *C01B 17/806* (2013.01); *D21C 11/0064* (2013.01); *D21C 11/04* (2013.01); *B01D 5/003* (2013.01); *B01D 5/0054* (2013.01); *B01D 5/0075* (2013.01); *C01B 17/60* (2013.01)

(58) Field of Classification Search
CPC ......... C01B 17/69; C01B 17/74; C01B 17/76; C01B 17/80; C01B 17/803; C01B 17/806; D21C 11/06; D21C 11/08; F28C 1/00; F28C 3/00
See application file for complete search history.

(56) References Cited

U.S. PATENT DOCUMENTS

| | | | |
|---|---|---|---|
| 4,029,751 A | 6/1977 | Dorr et al. | |
| 4,562,795 A | 1/1986 | Kraus | |
| 4,744,967 A | 5/1988 | Brand et al. | |
| 4,776,391 A * | 10/1988 | Warner | ................ B01D 53/002 165/111 |

FOREIGN PATENT DOCUMENTS

| | | |
|---|---|---|
| CN | 102877350 A | 1/2013 |
| CN | 102887486 A | 1/2013 |
| CN | 105600757 A | 5/2016 |
| FR | 2690934 A1 | 11/1993 |
| SE | 510171 C2 | 4/1999 |
| WO | WO 2010/019079 A1 | 2/2010 |

OTHER PUBLICATIONS

Finnish Patent and Registration Office, Opinion on Patentability for Application No. 20165665, dated Apr. 7, 2017, 9 pages, Finland.
Valmet Technologies Oy, Applicant's Response to Apr. 7, 2017 Finnish Office Action for Application No. 20165665, dated Aug. 3, 2017, 12 pages, Finland.
Finnish Patent and Registration Office, Notice of Allowance for Application No. 20165665, dated Apr. 6, 2018, 1 pages, Finland.
International Searching Authority (ISA), International Search Report and Written Opinion for International Application No. PCT/FI2017/050579, dated Oct. 24, 2017, 10 pages, European Patent Office, Germany.
Valmet Technologies Oy, Applicant's Informal Response to the ISA's Oct. 24, 2017 Written Opinion for International Application No. PCT/FI2017/050579, dated Jun. 18, 2018, 6 pages, Switzerland.

\* cited by examiner

*Primary Examiner* — Timothy C Vanoy
(74) *Attorney, Agent, or Firm* — Alston & Bird LLP

(57) ABSTRACT

A system for producing aqueous sulphuric acid is provided, the system including a first heat exchanger configured to cool aqueous sulphuric for producing cooled aqueous sulphuric acid; a pre-cooling unit comprising an inlet or inlets for receiving the gas containing sulphur trioxide and the cooled aqueous sulphuric acid, an outlet for letting out aqueous sulphuric acid and the gas containing sulphur trioxide, and a first nozzle for spraying the cooled aqueous sulphuric acid onto the gas containing sulphur trioxide. The system further includes a condensation tower comprising a first inlet for receiving the cooled gas containing sulphur trioxide and aqueous sulphuric acid from the pre-cooling unit and means for circulating the aqueous sulphuric acid within the condensation tower by spraying. An associated method and pre-cooling unit suitable for cooling gas comprising sulphur trioxide from at least 400° C. to at most 150° C. are also provided.

16 Claims, 5 Drawing Sheets

US 10,465,339 B2

SYSTEM AND A METHOD FOR PRODUCING AQUEOUS SULPHURIC ACID

CROSS REFERENCE TO RELATED APPLICATIONS

This application is a National Stage Application, filed under 35 U.S.C. § 371, of International Application No. PCT/FI2017/050579, filed Aug. 17, 2017, which claims priority to Finnish Application No. 20165665, filed Sep. 7, 2016; the contents of both of which as are hereby incorporated by reference in their entirety.

TECHNICAL FIELD

The invention relates to methods and systems for producing sulphuric acid. The invention relates to methods and systems for producing aqueous sulphuric acid. The invention relates to methods and systems for producing sulphuric acid from sulphur trioxide and water. The invention relates to a pulp mill, which in use and as a side product produces sulphur dioxide, and a system for producing sulphuric acid from the sulphur dioxide.

BACKGROUND

A method for producing sulphuric acid ($H_2SO_4$) from gas comprising sulphur dioxide ($SO_2$) is known from the patent SE 510 171. In the method, $SO_2$ is catalytically oxidized to sulphur trioxide ($SO_3$). By contacting $SO_3$ with water ($H_2O$) or aqueous sulphuric acid, the liquid can be strengthened, i.e. its sulphuric acid concentration can be increased. However, in the catalytic oxidization process, the temperature of $SO_3$ is high, typically over 450° C. Moreover both $SO_3$ and $H_2SO_4$ are chemically extremely active. Therefore, the materials used in the equipment need to be both heat and corrosion resistant. Such materials are very expensive. Since resources are typically limited, this limits the size of the equipment, whereby, for given resources, the $H_2SO_4$ production capacity may remain less than desired.

Moreover, the corrosive nature of sulphuric acid depends on its strength. Sulphuric acid is extremely corrosive in the strength range from about 20 w-% to 85 w-%. However, when the strength is even higher, such as 93 w-% or more, the corrosive nature of $H_2SO_4$ is less harsh. This is one reason, why conventional production plants include a strengthening tower configured to strengthen the sulphuric acid to a strength of at least 93 w-%. However, if materials are selected to withstand only substantially pure $H_2SO_4$, the process needs to be run in such a way that weaker sulphuric acid is not produced. Otherwise corrosion problems would occur, which could lead to leakage of strong $H_2SO_4$ posing health and environmental problems. A process may be hard to run in such a way, whereby such a process is considerably risky. Moreover, in many chemical processes involving sulphuric acid, only weaker sulphuric acid (i.e. aqueous sulphuric acid) is needed, whereby such a strengthening tower is not needed, provided that the system is configured to handle aqueous sulphuric acid. Due to the corrosive nature of aqueous sulphuric acid, suitable materials for the known systems are expensive.

Furthermore, even if corrosion resistant materials are used, the material wear or corrode to some extent during use. Thus, such systems may run to leakages and/or there may be a constant need for maintenance. Maintenance increases the operating costs, and leakages pose safety and environmental risks.

SUMMARY

A method for producing aqueous sulphuric acid is disclosed. The method allows for using less expensive materials, which are still durable in use. A corresponding system is also disclosed. In this way, the safety and environment risks can be reduced, while keeping the investment costs low. In addition, the equipment is configured in such a way that corroding parts can be easily replaced. In addition, a certain part of the system can be configured to take in most corrosion, and such sacrificial parts may also be easily replaceable.

In the method and the system, the gas containing $SO_3$ is pre-cooled in a pre-cooling unit before it is introduced in a condensation tower, wherein sulphuric acid $H_2SO_4$ (and/or $HSO_4^-$ and/or $SO_4^{2-}$) is produced. Because of the pre-cooling, the temperature of the condensation tower can be retained at a low level, whereby cheaper materials can be used therein. Moreover, the pre-cooling unit, which still requires heat and corrosion resistant materials, can be made much smaller than the condensation tower, in effect keeping the overall material costs low. Furthermore, when applied in connection with a pulp mill releasing some gas containing $SO_2$, the remaining $SO_2$ can be recovered in a scrubber as a reaction product usable in the pulp mill. The invention is more specifically disclosed in the claims.

DETAILED DESCRIPTION

Figure 1A:
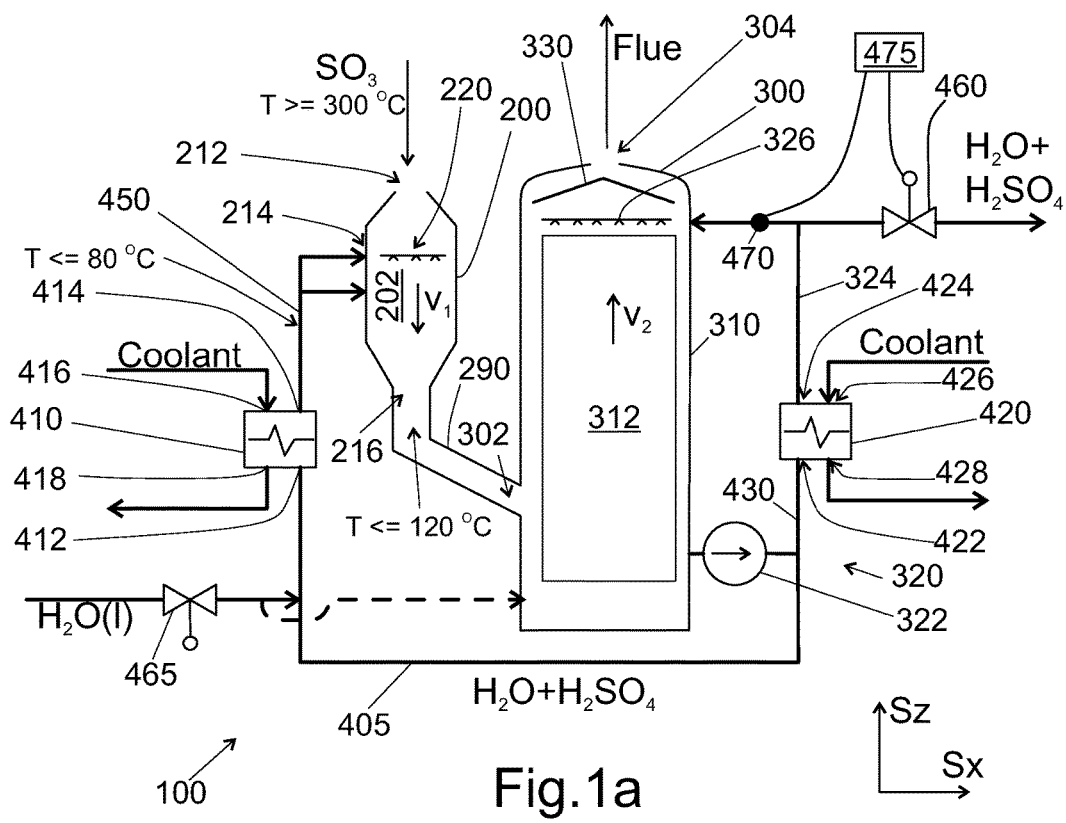
FIG. 1a shows schematically a system and a method for producing sulphuric acid, the system being shown in a side view.

FIG. 1a shows an embodiment of a system 100 for producing aqueous sulphuric acid. In the figures, Sz denotes a vertical direction. Both the directions Sx and Sy are perpendicular to each other and horizontal. The system 100 is connected to a source configured to produce some gas comprising sulphur trioxide $SO_3$. An inlet 212 for this gas is shown in the figure. The system 100 is configured to receive [i] water $H_2O$ and [ii] the gas comprising sulphur trioxide $SO_3$. The water that is received may be in the form of substantially pure water or in the form of aqueous sulphuric acid comprising water. Furthermore, the system 100 is configured to react the water $H_2O$ with the sulphur trioxide $SO_3$ to produce sulphuric acid $H_2SO_4$. In particular the system is configured to produce aqueous sulphuric acid.

In this description, the term "aqueous sulphuric acid" refers to an aqueous solution of sulphuric acid, in which the content of sulphuric acid is at most 80 w-%. As discussed below, in a typical process, the strength of the aqueous sulphuric acid is at most 70 w-%. At a given temperature, the strength of aqueous sulphuric acid correlates with its density and pH, which can be used as evidence on the strength of the aqueous sulphuric acid. In alternative terms, the term "aqueous sulphuric acid" refers to a liquid that can be made by mixing only water $H_2O$ and sulphuric acid $H_2SO_4$, wherein the weight percentage of $H_2SO_4$ is at most 80 or at most 70. As known to a skilled person the aqueous solution of $H_2SO_4$ will result in the following reactions:

$$H_2SO_4 + H_2O \Leftrightarrow H_3O^+ + HSO_4^-$$

and $$HSO_4^- + H_2O \Leftrightarrow H_3O^+ + SO_4^{2-}$$

In both these reactions, the balance is strongly to the right side. Throughout this description, the terms "aqueous sulphuric acid" and "aqueous $H_2SO_4$" refer to an aqueous solution comprising at least $H_2O$, $H_3O^+$, and $HSO_4^-$ or $SO_4^{2-}$. The aqueous sulphuric acid may be free from $H_2SO_4$ or $HSO_4^-$ or $SO_4^{2-}$ as indicated by the reactions above.

Purposes of producing only aqueous sulphuric acid are twofold. First, when sulphuric acid is only needed in a process that only needs aqueous sulphuric acid, the aqueous sulphuric acid can be produced in a resource efficient manner compared to producing substantially pure $H_2SO_4$ and diluting it in the process. Second, when strong sulphuric acid is not needed, also a strengthening tower is not needed. This helps to keep the investment costs low.

In the method and system, sulphuric acid is produced in an exothermic reaction of $SO_3$ with water. The water may be contained in aqueous sulphuric acid. The reaction can be formally written as $$SO_3 + H_2O \Leftrightarrow H_2SO_4 + heat.$$

With reference to FIG. 1a, the system 100 comprises a pre-cooling unit 200 configured to pre-cool the gas containing sulphur trioxide $SO_3$. The pre-cooling unit 200 comprises a first inlet 212 for receiving the gas containing sulphur trioxide, a second inlet 214 for receiving cooled aqueous sulphuric acid or cooled water (i.e. water that is free from $HSO_4^-$ or $SO_4^{2-}$). The pre-cooling unit 200 comprises a first nozzle 220 configured to spray the cooled aqueous sulphuric acid and/or the cooled water onto the gas containing sulphur trioxide to cool the gas containing sulphur trioxide. Simultaneously the water reacts with $SO_3$ as indicated above. When the water reacts with sulphur trioxide, some of the sulphur trioxide forms sulphuric acid. In this way, the aqueous sulphuric acid strengthens to some extent in the pre-cooling unit 200; or some of the water is converted to aqueous sulphuric acid in the pre-cooling unit 200. The pre-cooling unit 200 comprises also an outlet 216 for letting out the aqueous sulphuric acid and the gas comprising sulphur trioxide.

With reference to FIG. 1a in a corresponding method, the gas containing sulphur trioxide is received such that at the first inlet 212, the temperature of the gas containing sulphur trioxide is at least 300° C. Typically, $SO_3$ is produced in a catalytic oxidizing process, wherein the temperature may rise above 450° C., such as from 460° C. to 480° C. However, the gas may cool while conveyed to the pre-cooling unit 200. Typically the gas comprising sulphur trioxide, when received in the pre-cooling unit 200 (i.e. at the inlet 212), comprises from 0.1 vol-% to 3 vol-% such as from 0.2 vol-% to 2 vol-% sulphur trioxide. As is evident, when $SO_3$ reacts with water, the $SO_3$ content decreases. Thus, the processed gas, denoted by "flue" in FIG. 1a, may be essentially free from $SO_3$. In case the gas containing sulphur trioxide further contains sulphur dioxide, the processed gas ("flue") may comprise sulphur dioxide.

Figure 5:
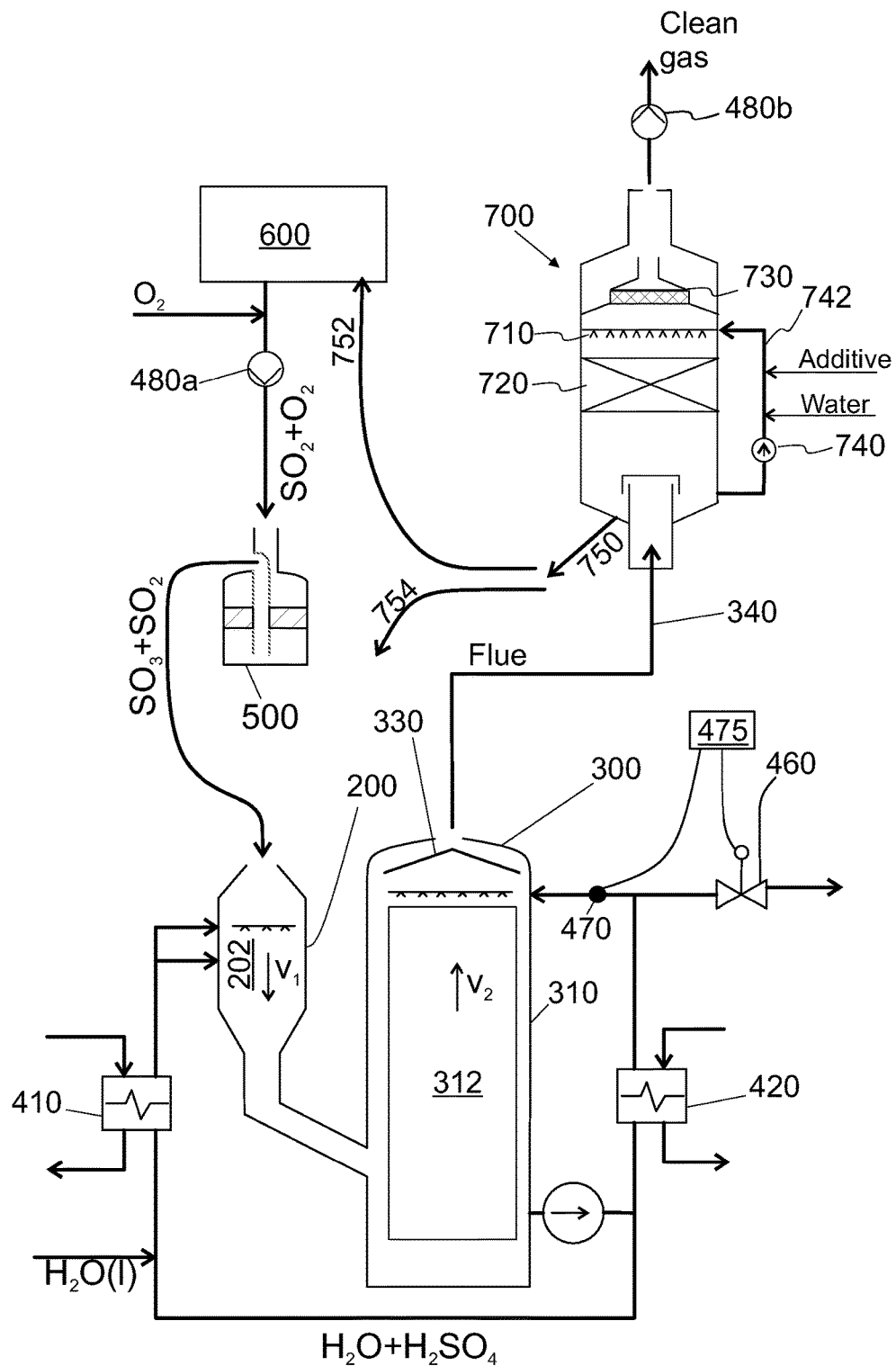
FIG. 5 shows a system configured to recover remaining $SO_2$ from flue gas in a scrubber as a reaction product usable in a pulp mill.

If needed, the processed gas (i.e. "flue") can be further washed in a scrubber 700 e.g. with scrubbing solution including alkali, such as NaOH, to remove essentially all sulphur from the flue (FIG. 5). This may happen e.g. when the flue is released to atmosphere in locations where environmental restrictions are high. This may happen in particular when the gas containing sulphur trioxide further contains sulphur dioxide, as will be discussed in detail below.

In the pre-cooling unit 200, the gas containing sulphur trioxide is cooled to a temperature of at most 120° C., preferably at most 100° C., by spraying cooled liquid (e.g. the aqueous sulphuric acid and/or water) onto the gas containing sulphur trioxide. The temperature refers to the temperature of the gas at the outlet 216 of the pre-cooling unit 200. As indicated above, least some of the sulphur trioxide forms sulphuric acid by reacting with water, optionally the water of the aqueous sulphuric acid, thereby producing aqueous sulphuric acid or stronger aqueous sulphuric acid.

The system 100 further comprises a first heat exchanger 410. The first heat exchanger 410 comprises a first inlet 412 for hot aqueous sulphuric acid and/or water, a first outlet 414 for cooled aqueous sulphuric acid and/or cooled water, a second inlet 416 for coolant (i.e. cooling medium) and an second outlet 418 for the coolant. The system further comprises a pipeline 450 configured to convey the cooled aqueous sulphuric acid and/or the cooled water from the first outlet 414 of the first heat exchanger 410 to the second inlet 214 of the pre-cooling unit 200. As evident, from the second inlet 214 of the pre-cooling unit 200 the aqueous sulphuric acid and/or water is conveyed to the first nozzle 220 in a pipeline.

Figure 2:
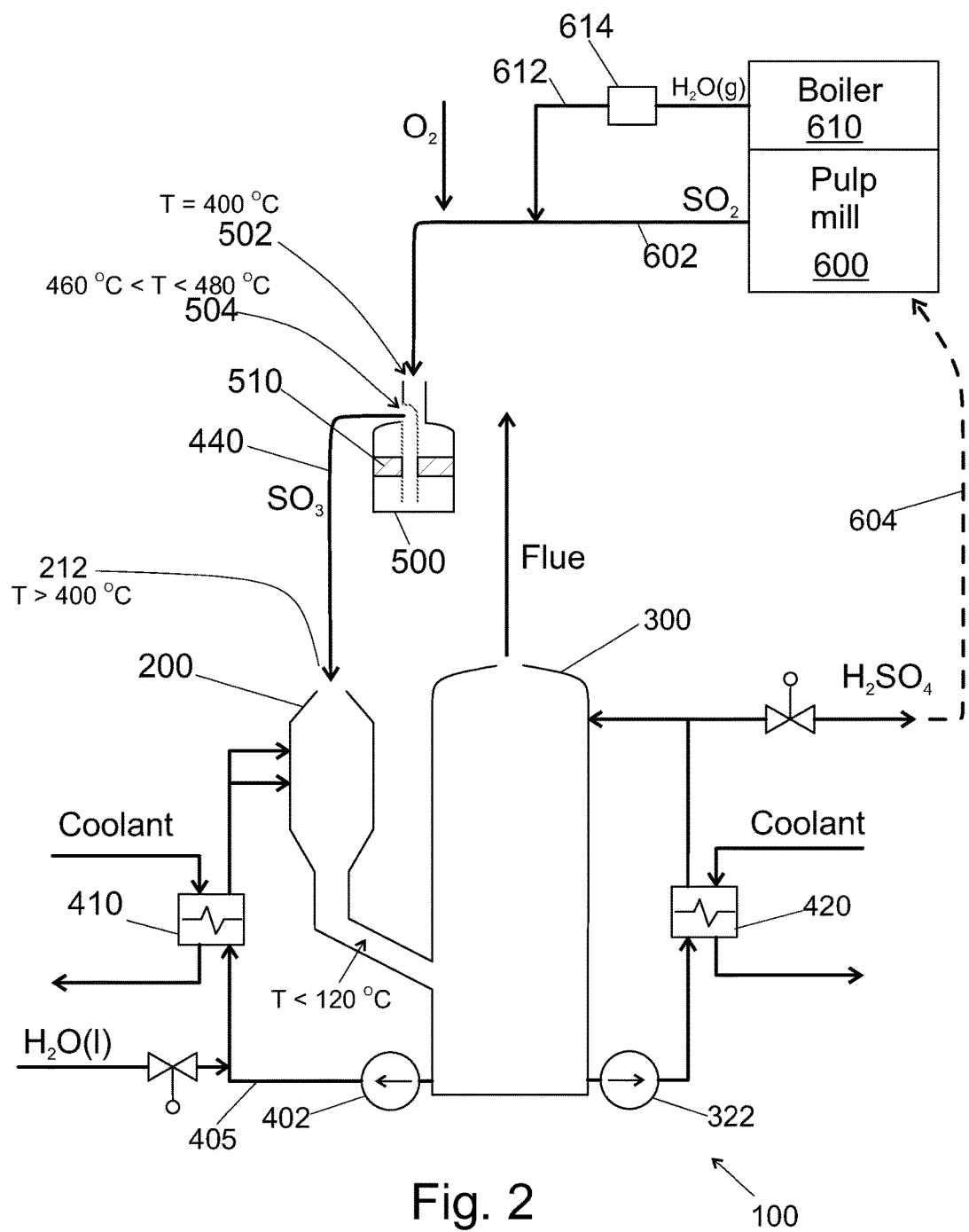
FIG. 2 shows schematically a system and a method for producing sulphuric acid.

When the process starts, and optionally also later on, water $H_2O$ is fed into the process for making the aqueous sulphuric acid. In FIG. 2 the liquid water is designated as $H_2O(l)$ to distinct from steam, i.e. gaseous water, $H_2O(g)$. Thus, in the beginning of the process the liquid that is conveyed from the first heat exchanger 210 to the pre-cooling unit 200 may be free from sulphuric acid or essentially free from sulphuric acid. However, as the process is driven for some time, the water is reacted to form the aqueous sulphuric acid. Moreover, in the method, the aqueous sulphuric acid from the condensation tower 300 and optionally some make-up water ($H_2O(l)$) e.g. through the valve 465) is fed via the heat exchanger 410 to the pre-cooling unit 200. Such make-up water is not needed after the start of the process, provided that the gas containing $SO_3$ further contains steam ($H_2O(g)$) to a sufficient amount.

Correspondingly, the method comprises cooling water and/or aqueous sulphuric acid thereby producing cooled water and/or cooled aqueous sulphuric acid. The cooling is done in the first heat exchanger 410 as indicated above. Preferably the water and/or aqueous sulphuric acid is cooled in such a way that the temperature of the water and/or aqueous sulphuric acid at the first outlet 414 of the heat exchanger 410 is at most 80° C.

The system 100 comprises a condensation tower 300. The condensation tower 300 comprises a wall 310 or walls 310 limiting a reaction chamber 312 for strengthening the aqueous sulphuric acid. The wall 310 may be an outer wall of the condensation tower 300. The condensation tower 300 comprises an inlet 302 for receiving the aqueous sulphuric acid and the gas comprising sulphur trioxide from the outlet 216 of the pre-cooling unit 200. As shown in the FIG. 1a, the system 100 comprises a pipeline 290 configured to convey the aqueous sulphuric acid and the gas comprising sulphur trioxide from the outlet 216 of the pre-cooling unit 200 to the condensation tower 300. The condensation tower 300 comprises means 320 for circulating the aqueous sulphuric acid within the reaction chamber 312 by spraying in order to strengthen the aqueous sulphuric acid. The means 320 may comprise a second nozzle 326, a pipeline 324 configured to convey aqueous sulphuric acid to the second nozzle 326, and a pump 322 configured to pump the aqueous sulphuric acid to the pipeline 324. The aqueous sulphuric acid may be pumped e.g. from the bottom of the reaction chamber 312.

The system 100 comprises a pump arrangement (322, 402) configured [i] to pump aqueous sulphuric acid from the condensation tower 300 to the first nozzles 220 via the first heat exchanger 410 and [ii] to pump aqueous sulphuric acid from the condensation tower 300 to the second nozzles 326. In FIGS. 1 and 5, a pump 322 is configured to pump aqueous sulphuric acid from the condensation tower 300 to the second nozzles 326 via the pipeline 324. In addition, the same pump 322 is, in the embodiment of FIGS. 1 and 5, configured to pump aqueous sulphuric acid from the condensation tower 300 to the first nozzles 220 via the first heat exchanger 410. However, as indicated in FIG. 2, the system may comprise another pump 402 configured to pump aqueous sulphuric acid from the condensation tower 300 to the first nozzles 220 via the first heat exchanger 410. Either of the pump arrangements may be used in connection with any embodiment of the invention. The system further comprises a pipeline 405 configured to convey aqueous sulphuric acid from the condensation tower 300 to the first heat exchanger 410. Correspondingly, an embodiment of method comprises conveying aqueous sulphuric acid from the condensation tower 300 to the first nozzles 220 via the first heat exchanger 410.

Correspondingly, the method comprises conveying [i] the cooled gas containing sulphur trioxide and [ii] the cooled water and/or aqueous sulphuric acid from the pre-cooling unit 200 to the condensation tower 300. The method further comprises strengthening, in the condensation tower 300, the aqueous sulphuric acid by circulating the aqueous sulphuric acid in the condensation tower 300 and by spraying the aqueous sulphuric acid onto the gas containing sulphur trioxide. In this way, sulphuric acid is produced into the aqueous sulphuric acid. In particular, by selecting the flow velocities within the pre-cooling device 200 and the condensation tower 300 properly, e.g. by selecting the cross-sectional areas of the pre-cooling device 200 and the condensation tower 300 properly, a large part of the reactions of $SO_3$ with $H_2O$ may occur in the condensation tower 300.

The method has the beneficial effect, that since the temperature of the gas containing sulphur trioxide is cooled before the condensation tower 300, the material of the condensation tower 300 need not be very heat resistant. In particular some plastics may be suitable for the material of the wall(s) 310 of the condensation tower 300. In an embodiment of the system, the wall 310 or the walls 310 of the condensation tower 300 comprise plastic material. Preferably the wall 310 comprises a part that extends through the wall 310 in the direction of thickness thereof, and that part consists of plastic material and optionally fibrous reinforcing material. Correspondingly, in an embodiment of the method, gas or gases are only conveyed into the condensation tower 300 in such a way that the temperature of the gas or gases is at most 120° C. at an inlet of the condensation tower 300.

Throughout this description, the term plastic refers to a synthetic or semi-synthetic organic compounds that are malleable and can be molded into solid objects. The term may refer to a material comprising an organic polymer (or comprising organic polymers), which may comprise also other substances. The term may refer to a synthetic material comprising an organic polymer.

As for the plastic material, preferably the wall 310 comprises weldable plastic material. Weldable materials can be easily joined to other weldable materials by welding. Thus, with such materials, manufacturing the condensation tower 300 becomes easier. However, the plastic material should be reasonably resistant to heat and corrosion. The plastic material may be heat resistant to at least 130° C. Therefore, preferably the plastic material comprises fluorinated plastic material, even if some other plastic materials are also heat resistant to a sufficient degree. In an embodiment, the wall 310 or the walls 310 of the condensation tower 300 comprises plastic material. In an embodiment, the wall 310 or the walls 310 of the condensation tower 300 comprises fluorinated plastic material. In an embodiment, the wall 310 or the walls 310 of the condensation tower 300 further comprise reinforcing material. In an embodiment, the reinforcing material is a synthetic fibrous reinforcing material. Examples of synthetic fibrous reinforcing material include glass fibres, carbon fibres, para-aramid synthetic fibres (Kevlar®), and/or aramid fibres. Preferably, the synthetic fibrous material is heat resistant to at least 130° C. In an embodiment, the wall 310 or the walls 310 of the condensation tower 300 comprise at least 10 w-% weldable plastic material in addition to fibrous reinforcing material. The weldable plastic material may be heat resistant to at least 130° C. The plastic material may be a fluorinated plastic material.

Figure 1B:
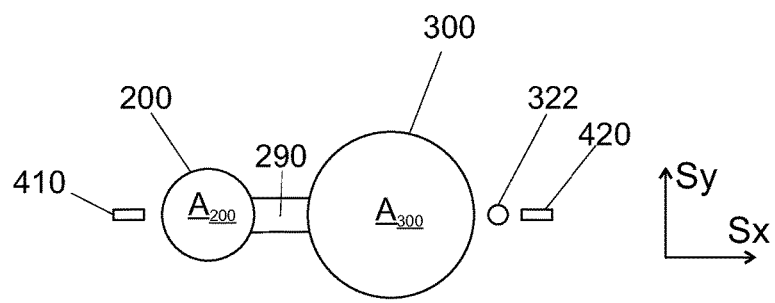
FIG. 1b shows schematically in a top view a system for producing sulphuric acid.

As indicated in FIGS. 1a and 1b, the system 100 comprises a pipeline 290 configured to convey the gas comprising $SO_3$ and the aqueous $H_2SO_4$ from the pre-cooling unit 200 to the condensation tower 300. Since the gas comprising $SO_3$ and the aqueous $H_2SO_4$ have been cooled already before the pipeline 290, in an embodiment, also the pipeline 290 comprises plastic material. What has been said above about the materials of the wall(s) 310 of the condensation tower 300 applies, in an embodiment, also to the material of the pipeline 290.

Regarding the temperature of the gas comprising $SO_3$ entering the condensation tower 300, it is pointed out that typically the gas comprising $SO_3$ further comprises steam. Therefore, when the temperature of the gas comprising $SO_3$ is as low as discussed above, strong sulphuric acid cannot be produced, since the steam of the gas comprising $SO_3$ becomes condensed. If stronger acid would be needed, a pre-cooling device could not be used, and the material requirements for a strengthening tower would be significantly stricter, since a strengthening tower needs to receive $SO_3$ at a high temperature, in order to avoid condensation of water and/or dilute $H_2SO_4$.

In an embodiment of the method, aqueous sulphuric acid is produced in such a way that the sulphuric acid concentration of the aqueous sulphuric acid does not exceed 80 w-%. This allows for selection of simple materials for the condensation tower 300. As indicated below, the production of stronger $H_2SO_4$ from $SO_3$ typically requires a higher temperature than indicated above.

Correspondingly, a system is free from such a strengthening tower that would be configured to strengthen the aqueous sulphuric acid to a strength of more than 80 w-%. As indicated above, since the present invention solves problems related to corrosion, there is typically no need for a strengthening tower. Omitting such a tower decreases the investment costs, because, as indicated above, plastic materials cannot be used in a strengthening tower because of the high temperatures involved with strengthening.

As evidenced by FIG. 1a, the concentration of $H_2SO_4$ can be controlled by the rate of water $H_2O(l)$ fed to the process and by the rate of aqueous sulphuric acid ($H_2O+H_2SO_4$) taken out from the process. The rate at which sodium trioxide $SO_3$ is fed to the process and the steam concentration of the gas containing $SO_3$ affect the rates of water and aqueous sulphuric acid. In an embodiment, water $H_2O(l)$ is fed to the process and aqueous sulphuric acid $H_2SO_4$ is taken out from the process in such a way that the sulphuric acid concentration of the aqueous sulphuric acid does not exceed 80 w-%.

For controlling the strength of the aqueous sulphuric acid $H_2SO_4$, the system 100 may comprise a first regulator 460, such as a valve 460, configured to regulate the flow of aqueous sulphuric acid $H_2SO_4$ from the process. Referring to FIG. 1a, the first regulator 460 may be configured to regulate the flow of aqueous sulphuric acid $H_2SO_4$ out from the system 100. Referring to FIG. 2, the first regulator 460 may be configured to regulate the flow of aqueous sulphuric acid $H_2SO_4$ within the system, e.g. to the pulp mill 600 of the system. Referring to FIG. 1a, the first regulator 460 may be configured to regulate the flow of such aqueous sulphuric acid $H_2SO_4$ that is taken out from the condensation tower 300 without returning it directly back to the condensation tower 300 or the pre-heating unit 200.

For controlling the strength of the aqueous sulphuric acid $H_2SO_4$, the system 100 may comprise a second regulator 465, such as a valve 465, configured to regulate the flow of water into the process. Referring to FIG. 1a, the second regulator 465 may be configured to regulate the flow of additional water into the pre-cooling unit 200. In the alternative or in addition, the water may be fed into the condensation tower 300, whereby the second regulator 465 may be configured to regulate the flow of additional water into the condensation tower 300, as indicated by a dotted line in FIG. 1a. Depending on the temperature of the added water, it may be beneficial to feed the water before the first exchanger 410 (as indicated in FIG. 1a), whereby also the water will be cooled; and/or to feed water (i.e. the water or some other water at some other temperature) after the first exchanger 410 (not shown in FIG. 1a), whereby that part of the water would not be cooled in the first heat exchanger 410.

In addition, the system 100 may comprise a sensor 470 configured to give information indicative of the strength of the aqueous sulphuric acid. The sensor 470 may be configured to measure at least one of electrical conductivity, electrical resistivity, density (i.e. specific mass), and molarity (e.g. by titration), of the aqueous sulphuric acid. As known, the electrical resistivity (and conductivity) correlates with the pH. The system may comprise a processing unit 475 configured to receive the information indicative of the strength of the aqueous sulphuric acid from the sensor 470, and by using this information control at least one of the first regulator 460 and the second regulator 465.

In a typical process, the gas containing $SO_3$ further contains steam to such an amount that water needs not to be added to process after the process has started. Moreover, in such a case the molar amount of aqueous sulphuric acid that is removed from the process is substantially the same as the molar amount of condensed steam. Typically, the steam to $SO_3$ ratio of the gas containing $SO_3$ is such that the final strength of the aqueous sulphuric acid is in the range of from 60 w-% to 75 w-%, when no additional water is fed to the process e.g. through the second valve 465 after the process has started. As indicated above, the strength may be controlled (i.e. decreased) by feeding some water or steam to the process.

In an embodiment, the system comprises a sensor configured to give information on the surface level of the aqueous sulphuric acid within the condensation tower 300. Provided that the surface level rises above a limit, aqueous sulphuric acid may be removed from the process. Aqueous sulphuric acid may be removed from the process to such an amount that the surface level of the aqueous sulphuric acid within the condensation tower 300 lowers below the limit or another limit. In a corresponding embodiment of the method, water is fed to the condensation tower 300 only initially, when the process is started.

Because the reaction of $SO_3$ with $H_2O$ is exothermic, if no further cooling was done, the aqueous sulphuric acid within the condensation tower 300 would heat up. This could pose problems related to safety, when plastic materials are used in the condensation tower 300.

Therefore, an embodiment of the system 100 comprises a second heat exchanger 420. The second heat exchanger 420 comprises a first inlet 422 for hot aqueous sulphuric acid, a first outlet 424 for cooled aqueous sulphuric acid, a second inlet 426 for coolant (i.e. cooling medium) and an second outlet 428 for the coolant. In the embodiment, the pump 322 is pump configured to pump aqueous sulphuric acid to the first inlet 422 of the second heat exchanger 420. Moreover, the pipeline 324 is configured to convey cooled aqueous sulphuric acid from the first outlet 424 of the second heat exchanger 420 to the second nozzle 326; and a pipeline 430 is configured to convey aqueous sulphuric acid from the reaction chamber 312 of the condensation tower 300 to the first inlet 422 of the second heat exchanger 420. When present, the second heat exchanger 420 can be considered to be a part of the means 320 for circulating the aqueous sulphuric acid within the reaction chamber 312 by spraying in order to strengthen the aqueous sulphuric acid.

A corresponding embodiment of the method comprises cooling the aqueous sulphuric acid before spraying it onto the gas containing sulphur trioxide in the condensation tower 300. In particular, a corresponding embodiment of the method comprises cooling the aqueous sulphuric acid in between [i] taking the aqueous sulphuric acid out from the condensation tower 300 and [ii] spraying it onto the gas containing sulphur trioxide in the condensation tower 300. As indicated above, the aqueous sulphuric acid is cooled in the second heat exchanger 420 and conveyed through the pipelines 430 and 324 from the condensation tower 300 to the second nozzle 326.

To prevent droplets of aqueous sulphuric acid from escaping from the condensation tower 300, in an embodiment, the condensation tower 300 comprises a first droplet separator 330. The first droplet separator is arranged above the reaction chamber 312 or in the upper part of the reaction chamber 312 of the condensation tower 300. The droplet separator 330 is configured to arrest some droplets of the aqueous sulphuric acid sprayed through the second nozzles 326, in order to prevent these from flowing with the flue gas out of the condensation tower 300.

Referring to FIG. 2, in an embodiment, the gas comprising sulphur trioxide $SO_3$ is produced in a converter 500 configured [i] to receive some gas containing at least some sulphur dioxide $SO_2$ and [ii] to convert (i.e. oxidize) at least some of the $SO_2$ to $SO_3$ by reacting $SO_2$ with oxygen $O_2$. Formally the oxidization reaction can be written as $$SO_2 + \tfrac{1}{2}O_2 \Leftrightarrow SO_3 + \text{heat}$$

The oxidization reaction is preferably catalysed using a catalyst, such as vanadium pentoxide $V_2O_5$ and/or platinum Pt.

The converter 500 comprises an inlet arrangement 502 for receiving sulphur dioxide $SO_2$ and oxygen $O_2$. The inlet arrangement 502 may comprise a first inlet for receiving gas comprising $SO_2$ but free from $O_2$ and a second inlet for receiving other gas comprising $O_2$. The inlet arrangement 502 may comprise only a first inlet for receiving gas comprising $SO_2$ and $O_2$. The inlet arrangement 502 may comprise a first inlet for receiving gas comprising $SO_2$ (optionally comprising also $O_2$) and a second inlet for receiving other gas comprising $O_2$ (optionally free from $SO_2$). The converter 500 comprises an outlet 504 for gas containing sulphur trioxide $SO_3$. The converter 500 comprises catalyst 510, such as $V_2O_5$ and/or Pt, for converting at least some of the sulphur dioxide $SO_2$ and the oxygen $O_2$ to sulphur trioxide $SO_3$. The system 100 comprises a pipeline 440 configured to convey gas containing sulphur trioxide $SO_3$ from the outlet 504 of the converter 500 to first inlet 212 of the pre-cooling unit 200.

The corresponding method comprises receiving sulphur dioxide $SO_2$ and oxygen $O_2$, both of them contained in some gas or gases. The method comprises catalytically oxidizing at least some of the sulphur dioxide $SO_2$ to sulphur trioxide $SO_3$ in the converter 500, thereby producing the gas containing sulphur trioxide $SO_3$. The method comprises conveying the gas containing sulphur trioxide $SO_3$ to the pre-cooling unit 200. An embodiment comprises using $V_2O_5$ and/or Pt to catalytically oxidize $SO_2$ to $SO_3$.

The oxidization reaction is somewhat sensitive to temperature. Typical catalysts perform well at temperature above 400° C. However, the reaction favours formation of $SO_3$ at low temperatures. Therefore, in an embodiment of the method, a reaction temperature in the converter 500 is adjusted to be from 350° C. to 480° C., such as from 400° C. to 480° C. The reaction temperature refers to the temperature within the converter 500 at a point that is in the middle between the inlet arrangement 502 and the outlet 504 along the flow path of the gas within the converter 500. The temperature in the converter 500 or of the converter 500 may be adjusted by using steam $H_2O(g)$ from a boiler 610. Preferably, some steam from the boiler 610 is fed to the converter 500 for adjusting the temperature within the converter 500. As indicated in FIG. 2, the steam may be mixed with the gas comprising $SO_2$ before they are fed to the converter 500. Preferably, steam is added to the gas comprising $SO_2$ in such a way that the temperature of the gas comprising $SO_2$ is 400° C. (given with one or two significant digits), such as from 370° C. to 430° C., at the inlet arrangement 502 of the converter 500. As indicated above, using excess steam decreases the strength of $H_2SO_4$ obtainable by the process. Thus, if used, the temperature of the steam should be high. In addition or alternatively, other means (e.g. a heater, such as a burner) may be used to control the temperature.

The balance of the oxidization reaction depends also on the ratio of oxygen to sulphur dioxide. Typically the molar ratio of $O_2$ to $SO_2$ is more than 3, such as at least 5.

A corresponding system 100 comprises means for adjusting the temperature of the converter 500. Such means may comprise a heater configured to heat the gas containing $SO_2$ and/or the converter 500. A corresponding system 100 may comprise a boiler 610 configured to produce steam and a pipeline 612 for conveying the steam and from bringing the steam in contact with the gas containing $SO_2$. The system 100 may comprise a control unit 614 configured to control the amount of steam in such a way that the reaction temperature in the converter 500 is within the aforementioned limits.

Because the oxidization reaction is exothermic, the temperature of the gas rises in the converter 500. Typically, the temperature of the gas at the outlet 504 of the converter 500 is from 460° C. to 480° C.

Even if the catalyst, the process temperature, and the molar ratio are suitably selected, the conversion efficiency of the converter 500 is not necessarily 100%. Typically, the conversion efficiency is at least 90%, i.e. at least 90 v-% of $SO_2$ is converted to $SO_3$. Even more typically, the conversion efficiency is in the range of from 93% to 98%. Therefore, the gas indicated by "Flue" in FIG. 2 may contain e.g. at most 3000 ppm $SO_2$, or more typically at most 1500 ppm $SO_2$. The flue may be scrubbed with a scrubber 700, as will be discussed in more detail below in connection with FIG. 5.

In an embodiment, circulation of the gas comprising $SO_3$ is enhanced with a pump or pumps 480a, 480b (see FIG. 5). A pump 480a may be arranged upstream from the pre-cooling unit 200, such as upstream from the catalytic reactor 500. Such a pump 480a is arranged to increase the pressure of the gas containing $SO_3$ and/or the gas containing $SO_2$, and thereby drive the gas towards the condensation tower 300. A pump 480b may be arranged downstream from the condensation tower 300, such as downstream from the scrubber 700. Such a pump is arranged to decrease the pressure of the flue, and thereby suck the gas containing $SO_3$ and/or the gas containing $SO_2$ towards the condensation tower 300.

When the pump (480a or 480b) or the pumps (480a and 480b) is/are used, one does not need to use additional carrier gas for conveying the gas containing $SO_2$ or $SO_3$. Therefore, the obtainable strength of the aqueous sulphuric acid is reasonably high. For example, in case medium-pressure steam was used to carry the gas containing $SO_2$ or $SO_3$, the steam would dilute the aqueous sulphuric acid.

Examples of suitable pumps and pump configurations in such systems are disclosed e.g. in the patent WO2010/019079. The document discloses liquid ring pumps (1a and 1b therein), equivalent to the pumps 480a, 480b discussed above. Such pump solutions are incorporated by reference to the present embodiments.

In an embodiment, the system 100 further comprises a pulp mill 600. A pulp mill 600 refers to an arrangement that converts wood chips or other plant fibre source into fibre boards. The fibre boards can be shipped to a paper mill for further processing. The pulp mill 600 may be a Kraft mill (i.e. a sulphate mill) or a sulphite mill. In an embodiment, the pulp mill 600 is a sulphate pulp mill. The aforementioned boiler 610 may be a part of the pulp mill 600 such as the sulphate pulp mill 600.

As a side product, the pulp mill 600 is configured to produce at least some gas containing sulphur dioxide $SO_2$. The system 100 comprises a pipeline 602 configured to convey the gas containing sulphur dioxide from the pulp mill 600 to the inlet arrangement 502 of the converter 500. In such a system, the benefits are three-fold. First the sulphur dioxide, which has a pungent odour, can be safely removed from the pulp mill 600, thus reducing environmental disadvantages. Second, by using $SO_2$, aqueous sulphuric acid can be made. Third, since the pulp mill 600 requires some dilute sulphuric acid for operation, the produced aqueous sulphuric acid can be utilized in the pulp mill 600. To this end, an embodiment of the system 100 comprises a pipeline 604 for conveying the aqueous sulphuric acid from the condensation tower 300 to the pulp mill 600.

The corresponding method comprises separating some gas containing sulphur dioxide from a liquor circulation of a pulp mill 600 and conveying the gas containing sulphur dioxide to the converter 500. For the details of the liquor circulation of the sulphate pulp mill, see the patent SE 510 171. An embodiment comprises conveying at least some of the produced aqueous sulphuric acid to a pulp mill. An embodiment comprises conveying at least some of the produced aqueous sulphuric acid to the same pulp mill 600 from which the gas containing $SO_2$, which is converted to $SO_3$ in the converter 500 and to $H_2SO_4$ in the condensation tower 300, is received in to the converter 500.

As indicated above, the temperature in the pre-cooling unit 200 is high. Moreover, both $SO_3$ and $H_2SO_4$ are very corrosive. Therefore, the corrosion and heat resistance requirements of the materials of the pre-cooling unit 200 are high. Thus, the materials of the pre-cooling unit 200 are expensive. For this reason alone, the pre-cooling unit 200 should be relatively small, i.e. smaller than the condensation tower 300. Moreover, when the pre-cooling unit 200 is small in comparison to the condensation tower 300, the formation of $H_2SO_4$ can be shifted from the pre-cooling unit 200 mainly to the condensation tower 300. This helps the selection of the materials for the pre-cooling unit 200, as less $H_2SO_4$ will be produced therein.

For these reasons and with reference to FIG. 1b, in an embodiment, the pre-cooling unit 200 has a first cross sectional area $A_{200}$ on a plane having a surface normal that is parallel to the direction of flow of gases within the pre-cooling unit 200. The cross sectional area $A_{200}$ refers to the area in the aforementioned plane limited by such wall(s) of the pre-cooling unit 200 that limit the flow of the gas comprising $SO_3$. Correspondingly, the first cross sectional area $A_{200}$ refers to the area of the flow channel of the pre-cooling unit 200, in which the gas comprising $SO_3$ is configured to flow. Within the pre-cooling unit 200, the direction of flow of gases is parallel to the direction of the flow velocity $v_1$ of the gas containing $SO_3$ in the pre-cooling unit 200. The velocity $v_1$ shown in FIG. 1a by the corresponding arrow.

The condensation tower 300 has a second cross sectional area $A_{300}$ on a plane having a surface normal that is parallel to the direction of flow of gases within the condensation tower 300. The second cross sectional area $A_{300}$ refers to the area in the aforementioned plane limited by such wall(s) of the condensation tower 300 that limit the flow of the gas comprising $SO_3$. Such wall may be the walls 310, or the flow may be further limit by additional walls limiting the reaction chamber 312. Correspondingly, the second cross sectional area $A_{300}$ refers to the area of the flow channel of the condensation tower 300, in which the gas comprising $SO_3$ is configured to flow. Within the condensation tower 300, the direction of flow of gases is parallel to the direction of the flow velocity $v_2$ of the gas containing $SO_3$ in the condensation tower 300. The velocity $v_2$ shown in FIG. 1a by the corresponding arrow.

To have a lot of $H_2SO_4$ being produced in the condensation tower 300, the flow velocity of the gas comprising sulphur trioxide should be larger in the pre-cooling unit 200 than in the condensation tower 300. Therefore, in an embodiment, the second cross sectional area $A_{300}$ is greater than the first cross sectional area $A_{200}$ (i.e. $A_{300} > A_{200}$). In an embodiment, the second cross sectional area $A_{300}$ is at least two times or at least three times the first cross sectional $A_{200}$ area (i.e. $A_{300} \geq 2 \times A_{200}$ or $A_{300} \geq 3 \times A_{200}$). As indicated in FIG. 1b, the cross sections may be circular. In an embodiment, the diameter of the cross section of the pre-cooling unit 200 is from 0.3 m to 2.4 m. In an embodiment, the diameter of the cross section of the condensation tower 300 is at least 1.5 m, such as from 1.5 m to 8 m. In case the pre-cooling unit 200 is not circular, the aforementioned values apply to an effective diameter $2 \times \sqrt{(A_{200}/\pi)}$. In case the condensation tower 300 is not circular, the aforementioned values apply to an effective diameter $2 \times \sqrt{(A_{300}/\pi)}$.

When using such a system 100, i.e. in an embodiment of a method, the gas comprising sulphur trioxide has a first flow velocity $v_1$ (see FIG. 1a) in the pre-cooling unit 200 and the gas comprising sulphur trioxide has a second flow velocity $v_2$ (see FIG. 1a) in the condensation tower 300. In an embodiment the magnitude of the second flow velocity $v_2$ is less than the magnitude of the first flow velocity $v_1$ (i.e. $v_2 < v_1$). Preferably, the magnitude of the second flow velocity is at most half or at most one third of the magnitude of the first flow velocity (i.e. $v_2 \leq v_1/2$ or $v_2 \leq v_1/3$). The term magnitude is used, because velocities in general are vectors.

Figure 3:
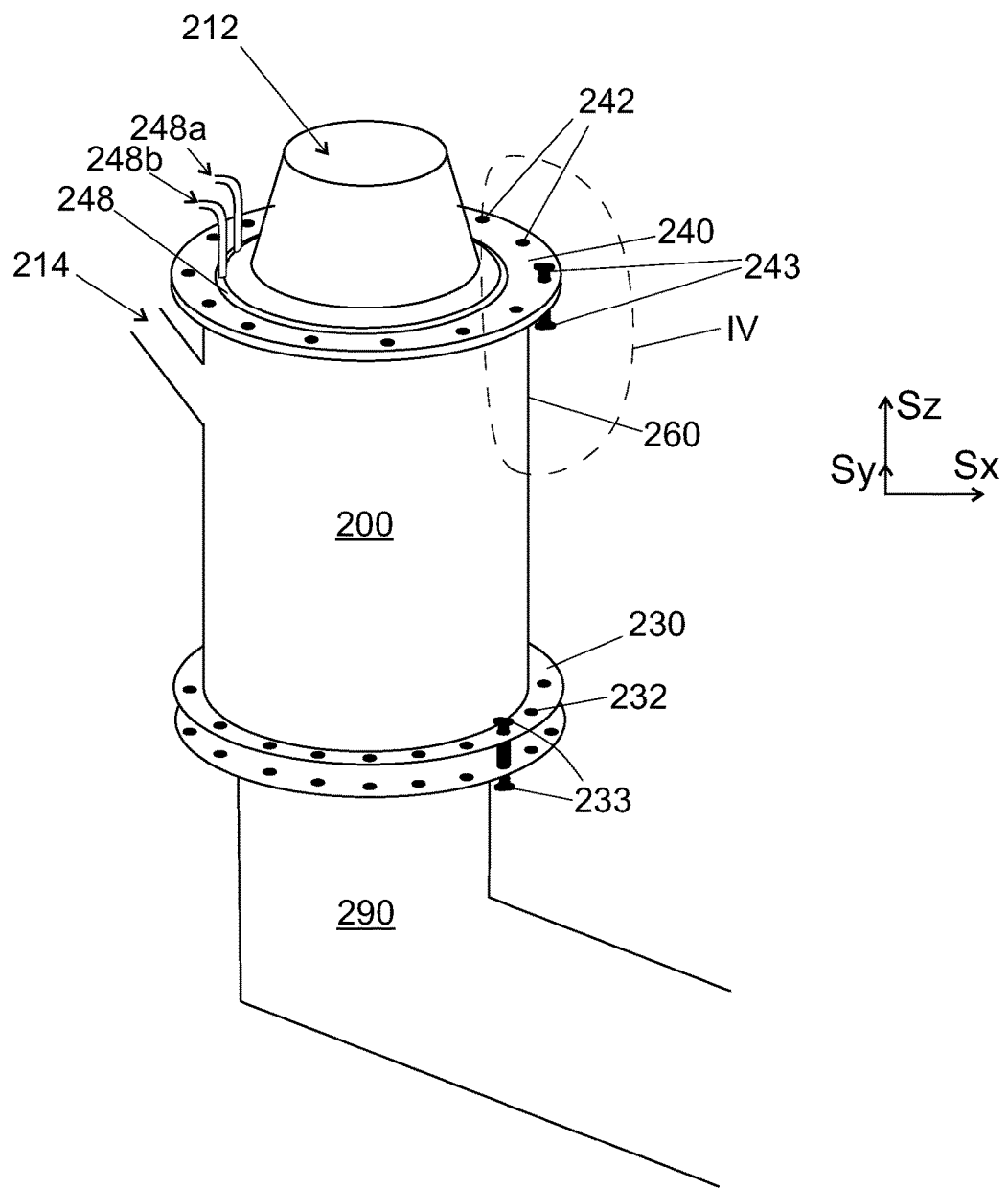
FIG. 3 shows a pre-cooling unit in more detail.

Referring to FIG. 3, because of the corrosive conditions within the pre-cooling unit 200, preferably at least part of the pre-cooling unit 200 of the system 100 is changeable. For example, the whole pre-cooling unit 200 may be connected to the pipeline 290 with first openable locking means 233, such as nuts and bolts. The pre-cooling unit 200 may comprise a flange 230 that is arranged to be joined to the pipeline 290 with the first openable fastening means 233. The shape of the pre-cooling unit 200 may be adapted to function in combination with the first openable fastening means 233. For example, the pre-cooling unit 200, such as the flange 230 thereof, may limit holes 232 for a nut and bolt 233, which serve as openable fastening means 233.

As an alternative or in addition to the solution of FIG. 3, the pipeline 290 may be connected to the condensation tower 300 in a similar, openable, manner. Correspondingly, the pre-heating unit 200 may comprise the pipeline 290. Thus, in an embodiment, the pre-cooling unit 200 is connected with first openable fastening means 233 to the condensation tower 300. More specifically, in an embodiment, the pre-cooling unit 200 is connected with first openable fastening means 233 directly to the condensation tower 300 (not shown).

However, it has been noticed that the most corrosive points within the pre-cooling unit 200 are the ones, where the aqueous sulphuric acid condensates on the walls of the pre-cooling unit 200, in the inner side thereof. It has been found that most of the interior of the pre-cooling unit can be made acid proof in such a way that only a small corrosive part of the pre-cooling unit 200 needs to be replaced for every now and then for maintenance. The part that is designed to corrode during use will be referred to as a sacrificial lid 240 (see FIGS. 3 and 4).

Figure 4:
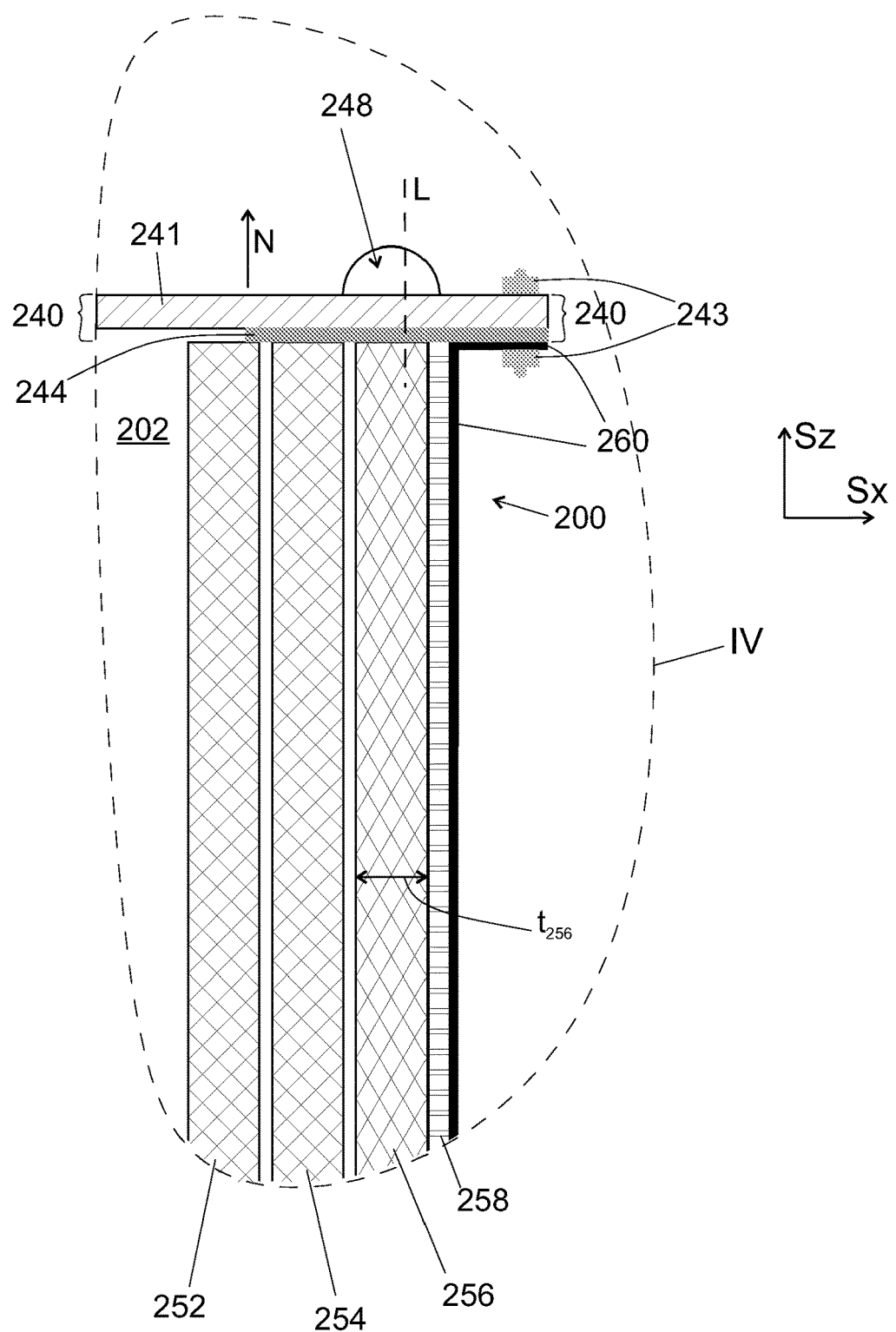
FIG. 4 shows the inner structure of the part IV of FIG. 3 in a detailed side view.

Referring to FIG. 4, in an embodiment, the pre-cooling unit 200 comprises a frame 260, such as an outer wall 260 of the pre-cooling unit 200. FIG. 4 shows the part IV of FIG. 3 in more detail. The frame 260 can be made of a material that is suitably heat resistant. The frame need 260 not be acid proof provided that it is sufficiently protected from the aqueous $H_2SO_4$ inside the pre-cooling unit 200. To insulate the frame 260 from the aqueous $H_2SO_4$ the pre-cooling unit 200 comprises a first inner wall 252 laterally surrounding a reaction chamber 202 of the pre-cooling unit 200. The first inner wall 252 is made of acid proof material, preferably from acid resistant bricks.

For better acid proofness, in an embodiment, the pre-cooling unit 200 comprises a second inner wall 254 laterally surrounding the first inner wall 252. The second inner wall 254 is made of acid proof material, preferably from acid resistant bricks. The pre-cooling unit 200 may comprise mortar in between the first inner wall 252 and the second inner wall 254.

When the first inner wall 252 is made from acid free bricks, the thickness of the first inner wall 252 is preferably from 80 mm to 150 mm, such as from 90 mm to 110 mm, such as 100 mm. When the second inner wall 254 is made from acid free bricks, the thickness of the second inner wall 254 is preferably from 80 mm to 150 mm, such as from 90 mm to 110 mm, such as 100 mm. These thicknesses may be applicable also to other suitably acid proof materials.

To thermally insulate the inner wall(s) 252, 254 from the outer wall 260, and in this way helping to maintain the proper reaction temperature within the reaction chamber 202, the pre-cooling unit 200 comprises a thermally insulating inner wall 256 laterally surrounding the reaction chamber 202 of the pre-cooling unit 200 and laterally surrounded by an outer wall 260 of the pre-cooling unit 200. Preferably, the thermally insulating inner wall 256 laterally surrounds the first inner wall 252, and if present, also the second inner wall 254.

To have the thermally insulating inner wall 256 reasonably thermally insulating, the material of the thermally insulating inner wall 256 may have a thermal conductivity κ of at most 0.1 W/m·K, preferably at most 0.05 W/m·K at a temperature 10° C. The thermally insulating inner wall 256 may be made of foam glass. In an embodiment, the thermally insulating inner wall 256 is made of foam glass and the thickness $t_{256}$ of the thermally insulating inner wall 256 is from 60 mm to 160 mm, such as from 70 mm to 100 mm, such as 80 mm; for it to have suitable thermal insulation properties. Preferably, the ratio (κ/$t_{256}$) of the thermal conductivity κ and the thickness $t_{256}$ is at most 5 W/m²·K, more preferably at most 1 W/m²·K, as calculated at the temperature 10° C. The pre-cooling unit 200 may comprise mortar in between the walls 252 and 256 and/or in between the walls 254 and 256.

To further protect the outer wall 260 from corrosion, the outer wall 260 may comprise, on the inner side thereof, a first lining 258. The first lining 258 may be e.g. a heat resistant polymer lining, such as a rubber lining. The heat resistance of the first lining 258 may be e.g. at least 100° C. It should be noted that because the outer wall 260 is in contact with the environment and may conduct heat reasonably well, the temperature of the second lining 258, in use, may be reasonably low. Moreover, the thermal insulation provided by the other walls (252, 254, 256) will help to keep the temperature of the first lining 258 reasonably low. The pre-cooling unit 200 may comprise mortar in between the first lining 258 and the thermally insulating inner wall 256.

In general, acid proof brick walls having an arbitrary shape are hard to manufacture. Therefore, the ceiling of the reaction chamber 202 of the pre-cooling unit 200 may be hard to insulate from the reaction chamber in an acid proof manner. To simplify the construction, in an embodiment, the pre-cooling unit 200 comprises a sacrificial lid 240. The sacrificial lid 240 is configured to corrode during use, and is thus arranged to be easily replaceable.

As indicated in FIG. 3, the sacrificial lid 240 is connected to the frame 260 with second openable fastening means 243, such as nuts and bolts, hooks, or clasps. The shape of the sacrificial lid 240 is adapted to the shape of the second openable fastening means 243. For example, as shown in FIG. 3, the sacrificial lid 240 limits holes 242 for fastening the sacrificial lid 240 to the frame 260 of the pre-cooling unit with nuts and bolts 243 (see also FIG. 4).

As indicated in FIG. 4, the sacrificial lid 240 is only weakly thermally insulated from the reaction chamber 202. Thus, the sacrificial lid 240 comprises material 241 that is heat resistant to at least 500° C. Preferably, all such parts of the sacrificial lid that extend through the sacrificial lid 240 in the direction of the thickness of the sacrificial lid 240 comprise material 241 that is heat resistant to at least 500° C. Preferably, the sacrificial lid 240 comprises a layer of a metal, such as steel, e.g. acid proof steel. This layer may be heat resistant as indicated above.

In addition, the sacrificial lid 240 comprises a second lining 244. The second lining 244 need not fully cover a side of the material 241. The purpose of the second lining is to protect at least a part of the layer 241 from liquid aqueous sulphuric acid. Therefore, the second lining 244 is arranged in between the interior of the pre-cooling unit 200 and the material 241. In other words, the second lining 244 faces towards the interior of the pre-cooling unit 200. The second lining 244 should be heat resistant to at least the boiling point of the aqueous sulphuric acid. In an embodiment, the second lining 244 is heat resistant to at least 230° C., preferably at least 300° C. In an embodiment, the second lining 244 comprises plastic material. In an embodiment, the second lining 244 comprises fluorinated plastic material. In an embodiment, the second lining 244 consists of plastic material. In an embodiment, the second lining 244 consists of fluorinated plastic material.

As indicated in FIG. 4, in an embodiment, the sacrificial lid 240 comprises a metal layer 241 that is partly coated with a second lining 244 that is heat resistant to at least 240° C. The second lining 244 may be made of e.g. a fluorinated plastic, such as polytetrafluoroethylene (i.e. Teflon), or non-fluorinated plastic having suitably high thermal resistance (e.g. some polyamides such as Nylon 66 or parylene).

Furthermore, in an embodiment, the pre-cooling unit 200 comprises a cooling channel 248 that is arranged in contact with the sacrificial lid 240. The cooling channel 248 is arranged in contact with the sacrificial lid 240 in a thermally conductive manner. In use, some liquid coolant may flow in the cooling channel 248. The pre-cooling unit 200 comprises an inlet 248a for this coolant and an outlet 248b for this coolant (see FIG. 3), through which the coolant can be circulated within the channel 248. The cooling channel 248 is arranged in contact with the sacrificial lid 240 in such a thermally conductive manner, that, in use, the temperature difference between [i] a liquid flowing inside the cooling channel 248 and [ii] a part of the sacrificial lid 240 is at most 50° C.

Preferably, the cooling channel 248 is arranged on an opposite side of the sacrificial lid 240 with respect to the second lining 244. Moreover, preferably the cooling channel 248 is arranged on the sacrificial lid 240 to such a location that a straight line L that is parallel to a surface normal N of the sacrificial lid 240 penetrates both the cooling channel 248 and the second lining 244. This has the technical effect, that as the coolant flowing in the cooling channel 248 cools the sacrificial lid 240 locally near the channel 248 itself, the aqueous sulphuric acid will condense at the point, where the cooling channel 248 is located; however, on the other side of the lid 240. Thus, the aqueous sulphuric acid will condense at a point comprising second lining 244, which protects the material 241 from corrosion at that point. As indicated in FIG. 4, the second lining 244 can be arranged also to locations that are cooler. Thus, the second lining 244 can be arranged also at all locations that are, in a lateral direction, further away from a centre of the reaction chamber 202 than the cooling channel 248. As indicated in the figure, typically the surface normal N is parallel to the thickness of the sacrificial lid 240.

However, as indicated in FIG. 4, at some of such locations that are in a lateral direction nearer to the centre of the reaction chamber 202 than the cooling channel 248, no second lining is necessarily present. In practice, an initially uniform second lining 244 may burn or melt at such locations. However, when the second lining 244 is resistant to temperatures higher than the boiling point of the aqueous sulphuric acid, at such locations, the metal layer 241 of the sacrificial lid 240 is only exposed to gaseous sulphuric acid, which is less corrosive than aqueous sulphuric acid. In this way, the corrosion resistance of the sacrificial lid 240 can be improved with the lining 244 even if the lining is not uniformly applied onto the sacrificial lid 240.

As indicated in FIG. 4, most preferably at least a part of the cooling channel 248, at least some second lining 244, and at least part of the thermally insulating inner wall 256 are arranged on a same straight line L that is parallel to a surface normal N of the sacrificial lid 240; such as on a same straight line L that is parallel to the direction of thickness of the sacrificial lid 240. This helps to control the location in which the condensation of aqueous sulphuric acid occurs, since also the thermally insulating inner wall 256 imposes a high temperature gradient within the pre-cooling unit 200.

Since the pre-cooling unit 200 may be replaceable, it is evident, that the pre-cooling unit 200 can be sold even without the rest of the system 100. In this way, a pre-cooling unit 200 may be seen as an embodiment independent of the other components of the system.

Referring to FIG. 5, in particular when the gas containing $SO_3$ further contains $SO_2$, e.g. due to incomplete catalytic reactions in the converter 500, the system may comprise a scrubber 700. In FIG. 5, a pipeline 340 is configured to convey flue from the condensation tower 300 to the scrubber. The scrubber 700 is configured to remove at least some $SO_2$ from the flue. Such $SO_2$ removal processes are known as flue-gas desulphurization.

In connection with a pulp mill, an extremely usable type of scrubber is a bisulphite scrubber. In a bisulphite scrubber, the sulphur dioxide is reacted with an aqueous solution of alkaline, thereby producing some bisulphite. As an example, an aqueous solution of NaOH may be used to scrub $SO_2$, resulting in sodium sulphite $Na_2SO_3$ and/or sodium bisulphite $NaHSO_3$, depending on the alkalinity of the scrubbing liquid. If the pH of the scrubbing liquid is about 10 or more, substantially only $Na_2SO_3$ and water will be produced by the reaction of $SO_2$ with NaOH.

Other possible alkalis include potassium hydroxide KOH and ammonia water $NH_3(aq)$. Using them in the scrubber 700 produces corresponding sulphite and/or bisulphite.

As known to a skilled person, such sulphites and/or bisulphites are used in a pulp mill. More precisely, such sulphites and/or bisulphites are needed in both a sulphate pulp mill (i.e. a Kraft pulp mill) and a sulphite pulp mill; even if a sulphite mill uses sulphites in larger amounts. For example, in a sulphate mill, sulphites and/or bisulphites may be utilized is the process of scrubbing vent gases containing chlorine dioxide $ClO_2$. In this way, the reaction products of the scrubber 700 are usable in the pulp mill 600 regardless of its type. A system comprises a channel 752 for conveying some reaction products from the scrubber 700 to the pulp mill 600. Such a means may comprise a pipeline 752 configured for the purpose. The reaction product may comprise at least one of a sulphite and a bisulphite. The reaction product may comprise at least one of sodium sulphite, sodium bisulphite, potassium sulphite, potassium bisulphite, ammonium sulphite $(NH_4)_2SO_3$, and ammonium bisulphite $NH_4HSO_3$.

FIG. 5 also shows a structure of a typical scrubber 700, which is wet scrubber, e.g. a bisulphite scrubber. The scrubber 700 comprises nozzles 710 for spraying scrubbing solution onto the flue gas. The scrubbing solution may comprise water and the aforementioned additive; which may be fed to the scrubber 700, or to a circulation of scrubbing solution, as indicated by the corresponding arrows. In addition, some oxidizing gas may be fed to the scrubber if needed. When sprayed with the nozzles 710, most of the scrubbing liquid falls to the bottom of the scrubber 700. To prevent droplets from escaping the scrubber 700, the scrubber 700 may comprise a second droplet separator 730. The second droplet separator 730 arrests most of also the small droplets, which, when forming larger droplets, fall to the bottom of the scrubber 700. The scrubber 700 comprises a pump 740 and a pipeline 742 for circulating the scrubbing solution from the bottom of the scrubber 700 to the nozzles 710. The scrubber 700 may comprise a packed bed 720 for improving the contact between the flue gas and the scrubbing solution.

A corresponding method comprises removing at least some $SO_2$ from the flue (i.e. the remaining gas) that is removed from the condensation tower 300. The $SO_2$ may be removed in a scrubber 700. The $SO_2$ may be removed in a wet scrubber 700. The $SO_2$ may be removed in a bisulphite scrubber 700 using an alkaline scrubbing solution.

The scrubber 700 comprises an outlet 750 for letting out at least some of the liquid reaction products. An embodiment comprises a channel 752, such as a pipeline 752, configured to convey at least some of the solid and/or liquid reaction products from the outlet 750 to a pulp mill 600. Another channel 754 may be used to convey another part of the reaction products e.g. to a waste treatment plant, e.g. if the scrubber is a two stage scrubber.

The invention claimed is:

1. A system (100) for producing aqueous sulphuric acid from a sulphur dioxide containing gas of a liquor circulation of a pulp mill (600), the system (100) comprising:

the pulp mill (600), configured to produce at least some gas containing sulphur dioxide;

a pipeline (602) configured to convey at least some of the gas containing sulphur dioxide to a converter (500), the converter (500) comprising:

an inlet arrangement (502) for receiving some gas containing at least some sulphur dioxide and some oxygen or some gas containing at least some sulphur dioxide and some other gas comprising oxygen, and catalyst (510) for converting at least some of the sulphur dioxide and the oxygen to sulphur trioxide, a pipeline (440) configured to convey gas containing sulphur trioxide from the converter (500) to an inlet (212) of a pre-cooling unit (200); and a first heat exchanger (410) configured to cool water and/or aqueous sulphuric acid for producing cooled water and/or cooled aqueous sulphuric acid, wherein:

the pre-cooling unit (200) is configured to pre-cool some gas containing sulphur trioxide, the pre-cooling unit (200) comprising:

the inlet or inlets (212, 214) for receiving [i] the gas containing sulphur trioxide and [ii] the cooled water and/or the cooled aqueous sulphuric acid, an outlet (216) for letting out aqueous sulphuric acid and the gas containing sulphur trioxide, and a first nozzle (220) for spraying the cooled water and/or the cooled aqueous sulphuric acid onto the gas containing sulphur trioxide to cool the gas containing sulphur trioxide and to react some of the sulphur trioxide with some of the cooled water and/or aqueous sulphuric acid, thereby strengthening or producing some aqueous sulphuric acid;
the system further comprises:
a pipeline (450) configured to convey the cooled aqueous sulphuric acid and/or the cooled water from the first heat exchanger (410) to the pre-cooling unit (200),
a condensation tower (300) comprising:
a first inlet (302) for receiving the cooled gas containing sulphur trioxide and aqueous sulphuric acid from the pre-cooling unit (200), and
means (320) for circulating the aqueous sulphuric acid within the condensation tower (300) by spraying in order to strengthen the aqueous sulphuric acid, and
a channel (290) configured to convey the aqueous sulphuric acid and the gas comprising sulphur trioxide from the outlet (216) of the pre-cooling unit (200) to the condensation tower (300).

2. The system (100) of claim 1, wherein at least one of:
the condensation tower (300) comprises a wall (310) or walls (310) limiting a reaction chamber (312) and the wall (310) or the walls (310) of the condensation tower (300) comprise plastic material; or
the wall (310) or the walls (310) of the condensation tower (300) further comprise fibrous reinforcing material.

3. The system (100) of claim 1, wherein the means (320) for circulating the aqueous sulphuric acid within the condensation tower (300) by spraying in order to strengthen the aqueous sulphuric acid comprises:
a second heat exchanger (420) configured to cool the circulated aqueous sulphuric acid,
a pump (322) configured to pump aqueous sulphuric acid through the second heat exchanger (410),
a second nozzle (326) for spraying cooled aqueous sulphuric acid onto the cooled gas containing sulphur trioxide within the condensation tower (300), and
a pipeline (324) configured to convey cooled aqueous sulphuric acid from the second heat exchanger (420) to the second nozzle (326).

4. The system (100) of claim 1, wherein the pulp mill (600) is a Kraft pulp mill (600).

5. The system (100) of claim 1, further comprising:
a scrubber (700) configured to scrub at least some sulphur dioxide from flue gas entering the scrubber (700) to produce clean gas; and
a pipeline (340) configured to convey flue gas from the condensation tower (300) to the scrubber (700).

6. The system (100) of claim 1, wherein the pre-cooling unit (200) is connected with first openable fastening means (233) to either:
the condensation tower (300); or
a pipeline (290) that is connected to the condensation tower (300).

7. The system (100) of claim 1, wherein the system is free from such a strengthening device that is configured to strengthen the aqueous sulphuric acid to sulphuric acid having a strength of more than 80 w-%.

8. The system (100) of claim 1, wherein at least one of:
the pre-cooling unit (200) comprises a sacrificial lid (240) and the sacrificial lid (240) is connected to a frame (260) of the pre-cooling unit (200) with second openable fastening means (243);
the sacrificial lid (240) comprises metal (241) that is coated with a second lining (244) that comprises plastic and is heat resistant to at least 240° C.;
the system further comprises a cooling channel (248) that is arranged in contact with the sacrificial lid (240);
at least a part of the cooling channel (248) and at least some of the second lining (244) are arranged on a same straight line (L) that is parallel to a surface normal (N) of the sacrificial lid (240); or
the pre-cooling unit (200) comprises:
a first inner wall (252) made of acid proof material and surrounding a reaction chamber (202) of the pre-cooling unit (200), and
a thermally insulating inner wall (256) surrounding the first inner wall (252), arranged in such a way that at least a part of the cooling channel (248), at least some of the second lining (244), and at least part of the thermally insulating inner wall (256) are arranged on a same straight line (L) that is parallel to a surface normal (N) of the sacrificial lid (240).

9. A method for producing aqueous sulphuric acid from a sulphur dioxide containing gas of a liquor circulation of a pulp mill (600), the method comprising the steps of:
separating some gas containing sulphur dioxide from a liquor circulation of the pulp mill (600),
conveying the gas containing sulphur dioxide to a converter (500),
in the converter (500), catalytically oxidizing at least some of the sulphur dioxide to sulphur trioxide, thereby producing the gas comprising sulphur trioxide,
conveying the gas comprising sulphur trioxide to a pre-cooling unit (200) such that such that at a an inlet (212) of the pre-cooling unit, the temperature of the gas containing sulphur trioxide is at least 300° C.,
in a first heat exchanger (410), cooling water and/or aqueous sulphuric acid thereby producing cooled water and/or cooled aqueous sulphuric acid,
in the pre-cooling unit (200), cooling the gas containing sulphur trioxide to a temperature of at most 120° C. by spraying the cooled water and/or the cooled aqueous sulphuric acid onto the gas containing sulphur trioxide using a first nozzle (220), whereby at least some of the sulphur trioxide forms aqueous sulphuric acid with the water and/or the aqueous sulphuric acid,
conveying the cooled gas containing sulphur trioxide and aqueous sulphuric acid from the pre-cooling unit (200) to a condensation tower (300), and
in the condensation tower (300), strengthening the aqueous sulphuric acid by circulating the aqueous sulphuric acid in the condensation tower (300) and by spraying the aqueous sulphuric acid onto the gas containing sulphur trioxide using a second nozzle (326).

10. The method of claim 9, wherein at least one of:
the gas comprising sulphur trioxide is only conveyed into the condensation tower (300) in such a way that at an inlet of the condensation tower (300) the temperature of the gas comprising sulphur trioxide is at most 120° C.; or
the wall (310) or the walls of the condensation tower (300) that limit a reaction chamber (312) for strengthening the aqueous sulphuric acid comprise plastic material.

11. The method of claim 9, further comprising:
conveying some aqueous sulphuric acid from the condensation tower (300) to a second heat exchanger (420),
cooling the aqueous sulphuric acid in the second heat exchanger (420) to produce cooled aqueous sulphuric acid, and
conveying at least some of the cooled aqueous sulphuric acid from the second heat exchanger (420) to the second nozzle (326) in the condensation tower (300) to spray at less some of the cooled aqueous sulphuric acid onto the gas containing sulphur trioxide.

12. The method of claim 9, wherein:

the temperature of the gas containing sulphur dioxide at an inlet arrangement (502) of the converter (500) is from 350° C. to 450° C., and the temperature of the gas containing sulphur trioxide at an outlet (504) of the converter (500) is from 460° C. to 480° C.

13. The method of claim 9, further comprising:

conveying flue gas from the condensation tower (300) to a scrubber (700); and removing some sulphur dioxide from the flue gas by scrubbing the flue gas in the scrubber (700).

14. The method of claim 9, wherein the aqueous sulphuric acid is produced in such a way that at least one of:

the sulphuric acid concentration of the aqueous sulphuric acid does not exceed 80 w-% in the condensation tower (300); or only such aqueous is produced, of which strength is less than 80 w-%.

15. A pre-cooling unit (200) suitable for cooling gas comprising sulphur trioxide from a temperature of at least 400° C. to a temperature of at most 150° C., the pre-cooling unit comprising:

an outer wall (260) limiting a reaction chamber (202) of the pre-cooling unit (200), an inlet or inlets (212, 214) for receiving [i] the gas containing sulphur trioxide and [ii] cooled water and/or cooled aqueous sulphuric acid into the reaction chamber (202), a first nozzle (220) for spraying the cooled water and/or the cooled aqueous sulphuric acid onto the gas containing sulphur trioxide to cool the gas containing sulphur trioxide and to react some of the sulphur trioxide with some of the cooled water and/or cooled aqueous sulphuric acid, thereby strengthening or producing some aqueous sulphuric acid, a thermally insulating inner wall (256) surrounded by the outer wall (260) and surrounding the reaction chamber (202), a first inner wall (252) made of acid proof material, surrounded by the outer wall (260) and surrounding the reaction chamber (202), a sacrificial lid (240) that comprises metal (241) that is coated with a lining (244) that comprises plastic material, the plastic material being heat resistant to at least 230° C. and facing the interior of the pre-cooling unit (200), and the sacrificial lid (240) being connected to the outer wall (260) with second openable fastening means (243), a cooling channel (248) that is arranged in contact with the sacrificial lid (240), an inlet (248*a*) for feeding coolant to the cooling channel (248), and an outlet (248*b*) for removing coolant from the cooling channel (248), wherein at least a part of the cooling channel (248) and at least some of the lining (244) are arranged on a same straight line (L) that is parallel to a surface normal (N) of the sacrificial lid (240).

16. The pre-cooling unit of claim 15, wherein:

at least a part of the cooling channel (248), at least some of the lining (244), and at least part of the thermally insulating inner wall (256) are arranged on a same straight line (L) that is parallel to a surface normal (N) of the sacrificial lid (240).

* * * * *